United States Patent
Zhou

(10) Patent No.: US 9,372,928 B2
(45) Date of Patent: Jun. 21, 2016

(54) SYSTEM AND METHOD FOR PARALLEL SEARCH ON EXPLICITLY REPRESENTED GRAPHS

(71) Applicant: Palo Alto Research Center Incorporated, Palo Alto, CA (US)

(72) Inventor: Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 439 days.

(21) Appl. No.: 13/932,377

(22) Filed: Jul. 1, 2013

(65) Prior Publication Data

US 2015/0006316 A1    Jan. 1, 2015

(51) Int. Cl.
*G06F 17/30* (2006.01)
*G06Q 30/06* (2012.01)
*G06Q 10/04* (2012.01)

(52) U.S. Cl.
CPC .... *G06F 17/30867* (2013.01); *G06F 17/30584* (2013.01); *G06Q 10/04* (2013.01); *G06Q 30/0631* (2013.01); *G06F 17/30445* (2013.01)

(58) Field of Classification Search
CPC ............... G06F 17/30598; G06F 17/30489; G06F 9/5066; G06F 17/30445; G06F 17/30451; G06F 17/30471; G06F 17/30498; G06F 8/456; G06F 17/12; G06F 17/30584; G06F 17/30958; G06F 8/314; G06F 8/453; G06F 17/30961; G06F 17/30595; G06F 17/30545; G06F 17/2247; G06F 17/2705; G06F 17/30224; G06F 17/30625
USPC ......................................................... 707/798
See application file for complete search history.

(56) References Cited

U.S. PATENT DOCUMENTS

| | | | | |
|---|---|---|---|---|
| 6,505,187 | B1 * | 1/2003 | Shatdal | G06F 17/30486 707/737 |
| 8,051,357 | B1 * | 11/2011 | Varnica | H03M 13/116 714/752 |
| 2012/0310916 | A1 * | 12/2012 | Abadi | G06F 17/30445 707/713 |
| 2013/0018755 | A1 * | 1/2013 | Zhang | G06Q 30/0631 705/26.7 |
| 2013/0254169 | A1 * | 9/2013 | Barber | G06T 11/206 707/687 |

* cited by examiner

*Primary Examiner* — Pierre Vital
*Assistant Examiner* — Andalib Lodhi
(74) *Attorney, Agent, or Firm* — Shun Yao; Park, Vaughan, Fleming & Dowler LLP

(57) ABSTRACT

One embodiment of the present invention provides a system for partitioning a graph representing customer purchases to facilitate parallel computations. During operation, the system initially receives graph data indicating vertices and edges of the graph, wherein the vertices represent customers and products and the edges represent purchases. Next, the system partitions edges of the graph to generate a partitioned graph such that each edge of the graph is a member of a respective partition. The system may then perform parallel computations on the graph data in one or more partitions to determine product recommendations.

15 Claims, 6 Drawing Sheets

SYSTEM AND METHOD FOR PARALLEL SEARCH ON EXPLICITLY REPRESENTED GRAPHS

BACKGROUND

1. Field

The present disclosure relates to graph search. More specifically, this disclosure relates to a method and system for parallel processing of explicitly represented graphs.

2. Related Art

Parallel graph search lies at the intersection of artificial intelligence, high-performance computing, and more recently, big data analytics. Unlike loosely coupled datasets, graphs typically have a much higher degree of interdependency and cross-coupling among vertices in the same graph. This renders the standard approach to parallelization based on MapReduce ineffective for all but the most trivial graphs, e.g., those that resemble trees. MapReduce is a software framework for processing large data sets in parallel across a distributed cluster of processors or stand-alone computers.

Most real-world graphs, such as social networks, transportation maps, and electric power grids, cannot be well approximated by trees to make them more map-reducible. This presents a significant risk for "big data," as most algorithms and software packages in this space are implemented on top of open-source MapReduce platform such as Hadoop. The lack of distributed yet scalable graph processing systems and methods can significantly impact the perceived value of various big data applications.

Because vertices of a graph interact in complex and usually unpredictable ways, it is desirable to detect and then eliminate duplicate encodings of the same vertex reached along alternative paths in the graph. But doing so may incur prohibitive communication and/or synchronization overhead among multiple computers or threads competing for the same piece of data, especially since MapReduce is not efficiently applicable to graphs. Approaches based on delaying duplicate detection to avoid excessive communication/synchronization overhead typically need to search a much (worst-case exponentially) larger space than those that catch duplicates immediately.

One example is the simple grid-path finding problem. In a 4-connected grid world, every vertex has 4 successors. Thus, the number of states explored without duplicate detection is $4^d$, where d is the depth of the search. If the parent of a vertex is never generated as its successor, then $3^d$ is the size of the search space if the graph is treated as a tree. However, there are only $O(d^2)$ unique vertices in a 2D grid world. Thus, there can be a huge difference, e.g., $O(3^d)$ vs. $O(d^2)$, in the size of the search space, if a graph is approximated by a tree. For real-world graphs, the difference is usually bigger because the branching factor, such as the average number of friends on a social network, is typically larger than 3 or 4.

Existing approaches to parallel graph search fall into the following four categories:

1. Approaches designed for implicit graphs. An implicit graph is a graph with vertices and edges determined algorithmically rather than being represented as explicit objects in a computer's memory. Without adaptation, such approaches are not directly applicable to explicitly represented graphs, which cannot be generated on the fly by applying a set of rules, as is done in implicit graph search typically found in planning and scheduling applications. Note that, in contrast to implicit graphs, an explicit graph is one in which every vertex and edge of the graph is represented as an object in one or more data stores or computers' memory.

2. Approaches designed for special-case operations on explicit graphs. They leverage some convenient properties of special graph operations that make the search much easier to parallelize. For example, computing the degree of separation on a social graph amounts to running a breadth-first search starting from the seed vertex. Also, because vertices are explored in breadth-first order, the first time a vertex is discovered, its degree of separation from the seed has to be the same, no matter how many duplicate paths exist between them and how many threads are running in parallel. This makes it unnecessary to perform thread synchronization, because even unsynchronized concurrent writes, which usually result in data corruption, still compute the correct answer in this special case. Such easy-to-parallelize operations are very limited, but once applicable, they can achieve great parallel speed ups without sophisticated graph processing system designs. On the other hand, if it cannot be guaranteed that all threads must write the same value to the same memory cell, then these approaches are not applicable.

3. Approaches designed for general operations on explicit graphs using frequent synchronization. They use synchronization to avoid data corruption under concurrent writes, and they are applicable to general graph operations. Because duplicates are detected as soon as they are generated, these approaches do not greatly expand the search space. However, since synchronization can be time-consuming, their parallel efficiency can be considerably lower than the special-case approaches in category #2.

4. Approaches designed for general operations on explicit graphs using MapReduce. They don't synchronize as often as approaches in the previous category. Instead, they tradeoff immediate duplicate detection for synchronization-free mapping of the graph. Duplicates are only detected and eliminated in the subsequent reduce phase(s), which usually requires synchronization. However, as mentioned earlier, delaying duplicate detection can result in (worst-case exponentially) more vertex expansions, these approaches can suffer from low parallel efficiency and/or high memory requirements (to store the duplicate search vertices).

In summary, approaches in categories 1 and 2 have limited applicability but possibly higher parallel efficiency, whereas those in categories 3 & 4 are broadly applicable but usually suffer from low speed and/or high memory requirements.

SUMMARY

One embodiment of the present invention provides a system for partitioning a graph representing customer purchases to facilitate parallel computations. During operation, the system initially receives graph data indicating vertices and edges of the graph, wherein the vertices represent customers and products and the edges represent purchases. Next, the system partitions edges of the graph to generate a partitioned graph such that each edge of the graph is a member of a respective partition. The system may then perform parallel computations on the graph data in one or more partitions to determine product recommendations.

In a variation on this embodiment, the partitioning comprises partitioning the edges of the graph based on the destination vertices associated with the edges.

In a variation on this embodiment, the partitioning comprises partitioning the edges of the graph based on the source vertices associated with the edges.

In a variation on this embodiment, the partitioning comprises partitioning the edges of the graph based on the source vertices to generate a predecessor-partitioned graph. The system also partitions the edges of the graph based on the destination vertices to generate a successor-partitioned graph. Then, the system combines the predecessor-partitioned graph and successor-partitioned graph to facilitate graph traversal in both directions in determining product recommendations.

In a variation on this embodiment, the parallel computations comprise traversing, in parallel, each partition of the graph to determine source vertices and/or destination vertices of edges in analyzing customer purchases.

In a variation on this embodiment, the parallel computations comprise executing an n-bit parallel breadth-first search where n bits represent a degree of separation and/or a vertex and n<8.

BRIEF DESCRIPTION OF THE FIGURES

In the figures, like reference numerals refer to the same figure elements.

DETAILED DESCRIPTION

Figure 1:
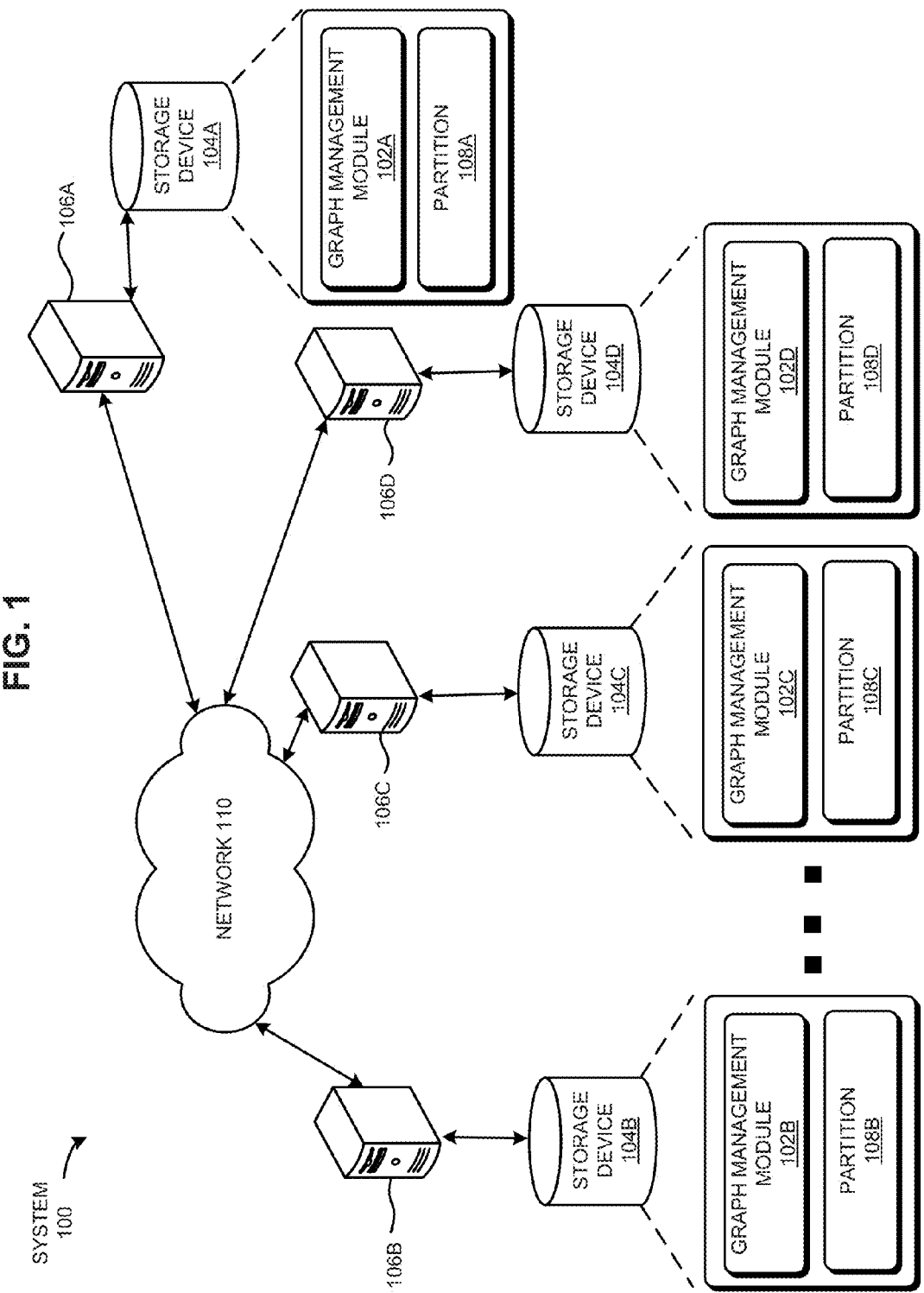
FIG. 1 presents a block diagram illustrating an exemplary architecture of a graph computation system utilizing the graph partitioning technique, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of facilitating parallel computations involving large, explicit graphs by partitioning the graph's edges based on their respective destination or source vertices, and storing distributed data representing disjoint sets of graph edges. Such a graph may be so large that data representing the graph does not fit into the memory or storage of a single machine, and so a graph computation system may partition and distribute data describing the graph among many storage devices and/or machines. Graph traversal is then free of synchronization overhead because only one server (or storage device) can write to each edge and its associated destination vertex, which results in increased efficiency.

Note that in an explicit graph, each edge points from a source vertex to a destination vertex, and a vertex can serve as a source vertex for one edge while also serving as a destination vertex for another edge. One need not infer the edges or vertices of an explicit graph. Furthermore, an undirected edge may be represented as two directed edges pointing in opposite directions between a pair of vertices.

Graphs partitioned based on the destination (e.g., successor) vertices may be referred to as successor-partitioned graphs, while graphs partitioned based on the source vertices may be referred to as predecessor-partitioned graphs. Some systems may also partition graphs so as to utilize both successor-partitioned graphs and predecessor-partitioned graphs.

With the disclosed graph partitioning technique, the system partitions the edges such that the set of destination vertices in each partition is disjoint from the set of destination vertices in other partitions. That is, no two partitions share the same destination vertex. This avoids creating a situation where two threads (or processes/cores/computers) waste time communicating and synchronizing with each other because they are operating on the same destination vertex. Furthermore, by partitioning on the edges, the technique guarantees partitionability even in the worst-case scenario where all possible edges are present in a graph.

To perform computations with an explicit directed graph, a graph computation system initially receives data describing the graph. In one embodiment, the system partitions the graph's edges based on the edges' destination vertices, so that the system may store the edges of the graph separately (e.g., in different storage devices or machines). No directed edge of the graph appears in two different partitions. Note that there may be two edges directed to opposite directions connecting two vertices. The system may then perform computations on the graph in parallel. For example, the system may execute, in parallel, collaborative filtering computations to recommend a product to a user. Collaborative filtering is a technique for predicting the interests of a user by collecting preference information from many users. The collaborative filtering computations may involve the system processing, in parallel, graph data across the different storage devices. Processors and/or processes and/or threads that are operating in parallel on the partitioned graph data need not communicate with each other while traversing the graph data. This significantly reduces the computational cost in terms of time and storage space, and facilitates a new category of broadly applicable and highly efficient techniques for parallel graph processing.

The novel graph partitioning technique disclosed herein is guaranteed to partition a graph that may or may not have any intrinsic structure. Partitionability is guaranteed even in the worst-case scenario of a fully connected graph. Furthermore, the space overhead required to store the partition-specific information is also minimal, yet one can achieve significant boosts in speed based on the parallel processing, as confirmed by experimental results.

Note that for the dual form of this partitioning technique involving traversing the graph from destination vertices to source vertices, one may partition edges based on the source vertices instead of the destination vertices. As indicated earlier, graphs partitioned based on the source (i.e., predecessor) vertices may be referred to as predecessor-partitioned graphs. Unlike traditional partitioning techniques that require examining both source vertex and destination vertices of edges, the techniques disclosed herein can partition based on one of either source vertices or destination vertices.

System Architecture

FIG. 1 presents a block diagram illustrating an exemplary architecture of a graph computation system 100 utilizing the graph partitioning technique, according to an embodiment. Graph computation system 100 may partition a graph and store the graph in multiple locations, such as different storage devices. These storage devices may be located in one or more machines. When the storage devices are located in multiple machines, there may be local graph management modules on individual machines for managing reading and writing parts of the graph. After partitioning the graph, graph computation system 100 may search through the graph to facilitate various applications such as collaborative filtering. Note that although FIG. 1 illustrates one embodiment with distributed-memory parallel graph search, other embodiments are also possible such as shared-memory parallel graph search.

Graph computation system 100 may include a graph management module 102A installed on a storage device 104A coupled to a server 106A. Server 106A may communicate with servers 106B, 106C, and 106D. Note that various implementations of the present invention may include any number of servers and storage devices. System 100 may include various graph management modules 102A, 102B, 102C, and 102D for executing graph operations related to writing and traversing the graph and other graph operations. System 100 may divide the graph into a number of partitions, and store the graph partitions as partitions 108A, 108B, 108C, and 108D in storage devices 104A, 104B, 104C, and 104D, respectively. In one embodiment, system 100 may partition the graph such that the number of partitions is equal to the number of nodes in a network cluster. The system may also partition the graph according to the number of partitions specified by a user.

In some embodiments, to facilitate efficient traversal of a graph, the system may store edges such that they can be efficiently indexed. The system may generate and utilize an index table for indexing the edges and store such index tables in the storage devices.

Graph Partitioning

Figure 2:
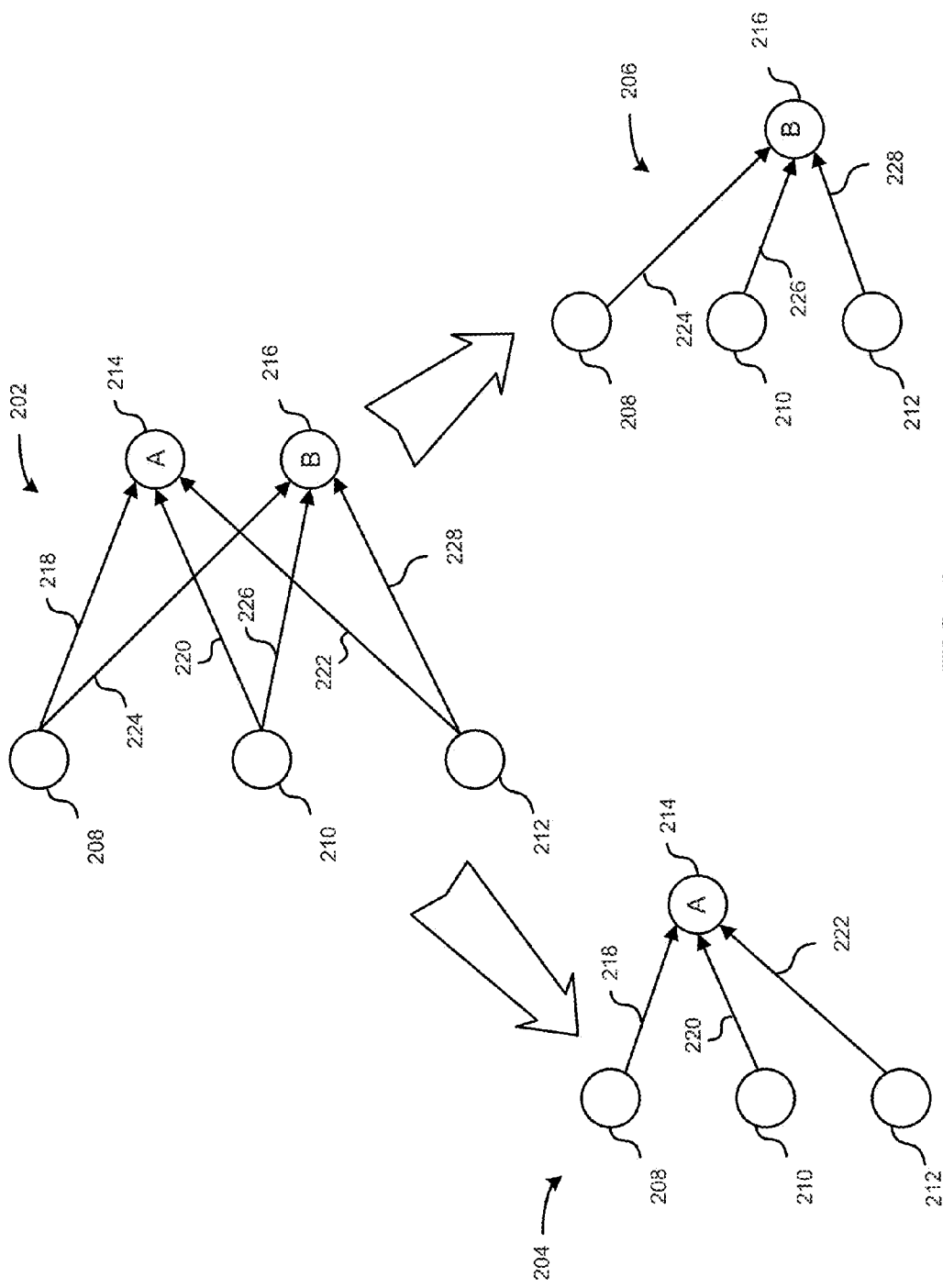
FIG. 2 presents a block diagram illustrating the graph partitioning technique, according to an embodiment.

FIG. 2 presents a block diagram illustrating the graph partitioning technique, according to an embodiment. FIG. 2 illustrates how system 100 may partition edges of a graph 202 into two graph partitions 204, 206 based on the destination vertices.

Graph 202 includes source vertices 208, 210, 212, destination vertices 214, 216, and edges 218, 220, 222, 224, 226 and 228. Edges 218, 220, 222 connect source vertices 208, 210, 212 with destination vertex 214. Edges 224, 226, 228 connect source vertices 208, 210, 212 with destination vertex 216.

In an exemplary implementation, the source vertices may represent people, and the destination vertices may represent products. For example, the person represented by source vertex 208 purchases a product represented by destination vertex 214. The person represented by source vertex 210 also purchases the product represented by destination vertex 214, as well as the product represented by destination vertex 216. By traversing the graph, system 100 can determine, through collaborative filtering, the different products that people purchase when they purchase certain products (e.g., the product represented by destination vertex 214). Thus, from the graph, the system can determine that the person represented by the vertex 210 purchases product represented by vertex 214 and product represented by vertex 216. The people represented by vertices 208, 210 both purchase the product presented by vertex 214.

The system may partition the edges of graph 202 into two graph partitions 204, 206, based on the destination vertices 214, 216, to facilitate parallel traversal of the graph. Graph partition 204 includes all the edges that are directed to vertex 214, which includes three edges 218, 220, and 222. Edges 218, 220, 222 are directed from source vertices 208, 210, 212 to destination vertex 214. Graph partition 206 includes all the edges that are directed to vertex 216, which includes three edges 224, 226, and 228.

The system may store and process graph partitions 204, 206 in separate storage devices and/or separate machines. For example, server 106B may traverse through graph partition 204 while server 106C traverses through graph partition 206. Note that server 106B and server 106C need not synchronize since they are traversing to different vertices. In one example application, the system can independently propagate degree of separation information in different partitions, in parallel, without contention between processors and/or computers. The degree of separation can be the number representing the number of chain introductions required to meet someone. For example, if the system is counting the degree of separation between vertices, and the degree of separation for vertices 208, 210, and 212 in graph partition 204 is 1, then server 106B can write that the degree of separation for vertex 214 is 2. At the same time, server 106C can write that the degree of separation for vertex 216 is 3 if the degree of separation for vertices 208, 210, and 212 in graph partition 206 is 2. There is no contention between server 106B and server 106C to write to the same vertex. Note that in some instances, destination vertex 216 may also serve as a source vertex pointing to destination vertex 214.

Figure 3:
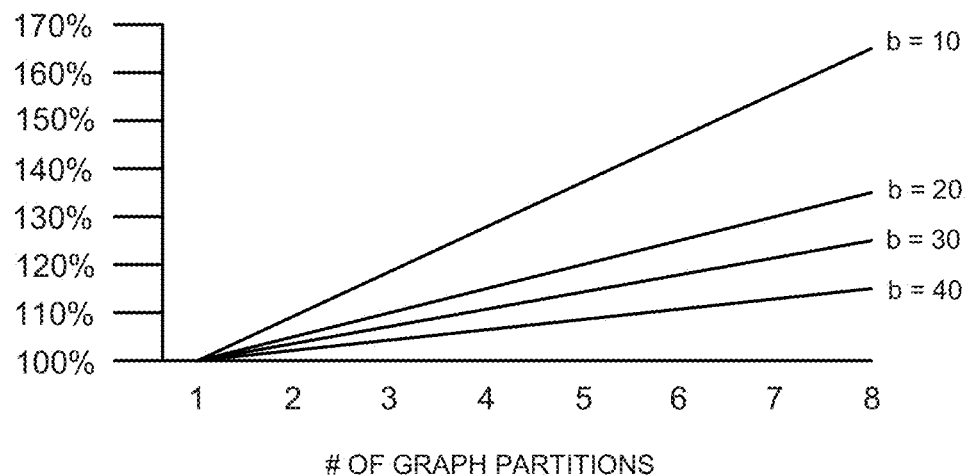
FIG. 3 presents a graph illustrating the worst-case relative size of a partitioned graph as the number of graph partitions increases, for different branching factor values, according to an embodiment.

FIG. 3 presents a graph illustrating the worst-case relative size of a successor-partitioned graph as the number of graph partitions increases for different branching factor values, according to an embodiment. As shown in FIG. 3, as a branching factor b increases, the relative size of a partitioned graph decreases for the same number of partitions. For example, at P=8, the partitioned graph is 64% larger than the original graph if b=10, but only 17% larger if b=40. For large-scale graphs such as social networks, a vertex (e.g., a person) may have about 40 or so links (e.g., friends). The relative space overhead of successor-partitioned graphs for social networks is therefore quite modest. Furthermore, reducing the number of partitions also reduces the extra space overhead. For example, at P=4, the partitioned graph is only 7% larger than the unpartitioned one, for b=40. Note that the best-case space complexity is the same for both partitioned and unpartitioned graphs, and therefore the actual space overhead of partitioned graphs can be less than the worst-case results shown in FIG. 3.

Figure 4:
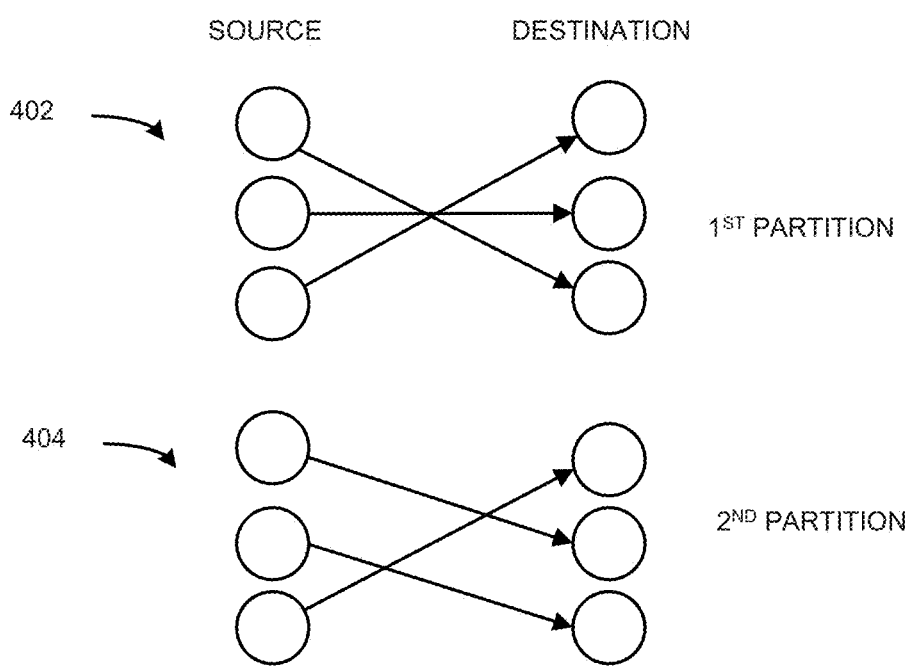
FIG. 4 presents a block diagram illustrating a best-case example of graph partitions with no additional space overhead.

FIG. 4 presents a block diagram illustrating a best-case example of graph partitions with no additional space overhead. FIG. 4 shows an example of a graph with two partitions 402, 404 that does not need extra space over its unpartitioned equivalent. Real-world graphs may not be exactly like the ones shown in FIG. 4. However, constraints such as geographical proximity and social locality can drive those real-world graphs toward a network structure that more closely resembles the two-partitioned (or n-partitioned) graph in FIG. 4. Thus, the space overhead of partitioned graphs can approach that of the unpartitioned graphs.

Exemplary Process

Figure 5:
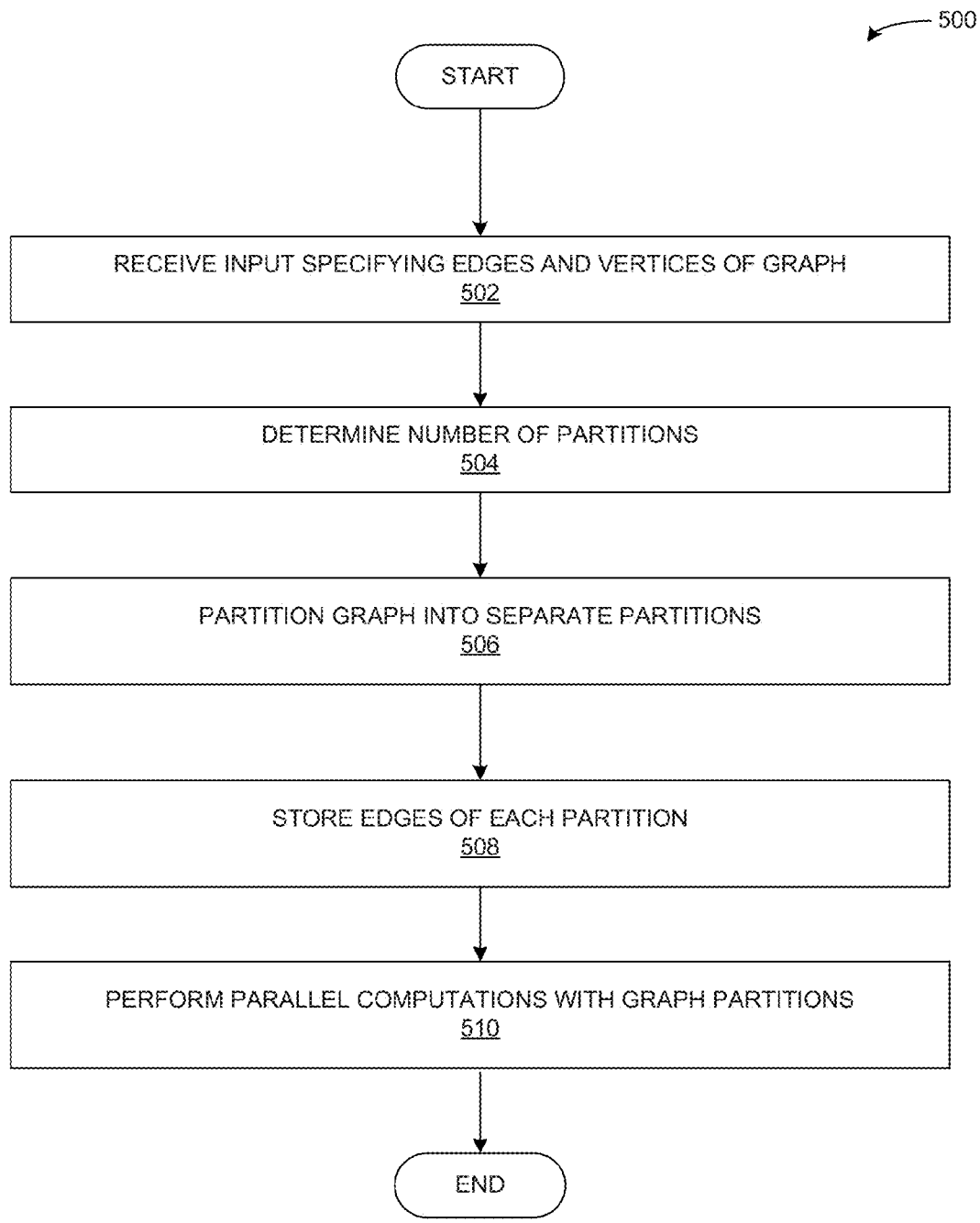
FIG. 5 presents a flowchart illustrating an exemplary process for partitioning a graph to facilitate parallel computations, according to an embodiment.

FIG. 5 presents a flowchart illustrating an exemplary process for partitioning a graph to facilitate parallel computations, according to an embodiment. During operation, the system initially receives input specifying edges and vertices of the graph (operation 502). The system may obtain the graph data through user input or as previously stored graph data. Next, the system determines the number of partitions (operation 504). For example, the system may determine that P=50 for 50 partitions. The system may also receive user input specifying the number of partitions.

The system then partitions the edges of the graph into separate partitions (operation 506). The system may initially determine which vertices are the source vertices and destination vertices of graph edges. Then, the system determines the range of destination nodes (the vertices of the graph may be labeled with a range of 1 to n) and may divide the range of destination vertices among P partitions. For example, a first partition may include vertices in the range [1, (n/P)], and a second partition may include vertices in the range [(n/P)+1, 2n/P], etc. Note that the average size of a partition is n/P and in the worst-case the range of the destination vertices is from 1 to n.

The system may store the edges associated with each partition. For example, the system may store the edges in various storage devices, in various files or directories, or on different machines (operation 508). After partitioning the graph, the system may perform parallel computations with the graph partitions, such as searching through the graph (operation 508).

Exemplary Apparatus

Figure 6:
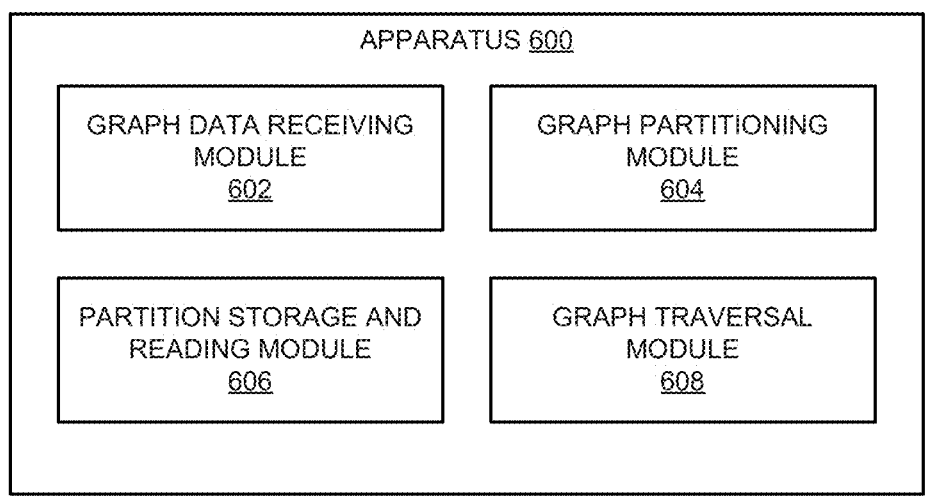
FIG. 6 illustrates an exemplary apparatus that facilitates partitioning graphs for parallel computations, in accordance with an embodiment.

FIG. 6 illustrates an exemplary apparatus 600 that facilitates partitioning graphs for parallel computations, in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a graph data receiving module 602, a graph partitioning module 604, a partition storage and reading module 606, and a graph traversal module 608.

In some embodiments, graph data receiving module 602 can receive the data describing vertices and edges of a graph. Graph partitioning module 604 can partition the graph using the techniques described herein. Partition storage and reading module 606 performs writing and reading to storage and any functions associated with partitioning and traversing the graph, and any other graph data manipulation functions associated with graph search. Graph traversal module 608 facilitates traversal of the graph in memory or storage. Note that graph management modules 102A-102D illustrated in FIG. 1 may provide any and all functions of the various modules depicted in FIG. 6.

Complexity Analysis

This section analyzes the complexity of the techniques described herein, and begins with some formal definitions and notation introduction, followed by analysis and additional examples and explanation.

A graph G consists of a set of vertices or a vertices $v \in V$, and a set of edges $e \in E$, where e is of the form (u, v), if and only if there is a directed edge from vertex u to vertex v in G. In this case, u is the predecessor of v, and v is the successor of u. If G is undirected, then $\forall (u, v) \in E \rightarrow (v, u) \in E$.

In one implementation, vertices may have unique integer identifiers in the range of [0, |V|) assigned to them. Symbols u and v denote the integer identifiers of a source vertex and a destination vertex associated with an edge, respectively. Let $v_{min-dest}$ and $v_{max-dest}$ be the minimum and maximum integer identifiers of destination vertices, i.e., those vertices with at least one (1) predecessor. Let P be the number of graph partitions that the system creates for G, and let $V_{min-dest}$ be an integer array of (P+1) elements such that $V_{min-dest}[0] = V_{min-dest}$ $V_{min-dest}[p] < V_{min-dest}[p+1]$, for $p=0,1,\ldots,P-1$.

$V_{min-dest}[P] = V_{max-dest}+1$

System 100 can divide the edge set E into P partitions such that:

$E_p = \{(u,v)|(u,v) \in E \wedge V_{min-dest}[p] \leq v < V_{min-dest}[p+1]\}$, for $p=0,1,\ldots,P-1$.

It can be shown that these edge partitions $E_p$ have the following properties:

$\cup_{p \in [0,P)} E_p = E$ $\forall i \neq j \rightarrow E_i \cap E_j = \emptyset$, $\forall (u_i,v_i) \in E_i \wedge (u_j,v_j) \in E_j \rightarrow v_i \neq v_j$ Correspondingly, system 100 may also divide the vertex set V into P partitions such that:

$V_p = \{v|\exists (u,v) \in E_p V(v,u) \in E_p\}$, for $p=0,1,\ldots,P-1$.

It can be shown that $\cup_{p \in [0,P)} V_p = V$, if the graph has no isolated vertex. Let $DV_p = \{v|\exists (u,v) \in E_p\}$ be the set of destination vertices in Partition p, for $p=0, 1, \ldots, P-1$.

It can be shown that these destination vertex sets $DV_p$ have the following property:

$\forall i \neq j \rightarrow DV_i \cap DV_j = \emptyset$

In other words, the set of destination vertices in one partition is guaranteed to be disjoint from the set of destination vertices in another partition. This is the main reason these partitions are created—because this guarantees that different threads (or computers) working on different partitions do not land on the same destination vertices. This ensures that concurrent writes from different partitions to the same vertex do not occur. If a single partition is only processed by a single thread, then it can be further guaranteed that there will be no concurrent writes to the same vertex. In the absence of concurrent writes, there is no need for different threads to synchronize during the graph traversal stage in order to prevent data corruption.

Although the traversal stage can be the most time-consuming part, it is usually not the only stage of a graph search process, which may include examining and possibly pruning the search states, arranging vertices on the frontier to be expanded next, and so on. Embodiments of the present invention do not restrict the type of non-traversal operations a graph search process performs, provided that, at the end of each traversal stage (or the beginning of the next traversal stage), updated search states are propagated to those threads that may be potentially affected. For well-structured graphs, it is possible that only a subset of threads need to receive such updates. It is also possible that each and every thread (or computer) must propagate its updated search states to the rest of threads (or computers). Embodiments of the present invention do not restrict the type of communication protocol(s) or memory architecture (e.g., shared vs. distributed memory) used to propagate search-state updates, as long as the process is notified once all the updates are done, so that it can proceed to the next operation, if any. For shared-memory computers, there may not be such an information propagation stage, since all local updates are immediately visible globally. In such a case, the process can just proceed to the next operation without delay.

If the original graph G is transformed into multiple partitions, extra space is required to store the partition-specific information that is not included in the original encoding of G.

Because an edge can only map to one partition, every edge in the original graph is represented exactly once in the partitioned encoding of G:

$$\Sigma_{p\in[0,P)}|E_p|=|E| \quad 5$$

Thus, a partitioned graph does not require extra space to represent the set of edges in the original graph. However, system 100 may use extra space to create efficient search indices for edges in these partitions.

Assume that an index entry takes the same amount of space to encode as an edge, and there are $|V|$ index entries, one for each vertex of the graph. The total space needed for the original graph is $O(|E|+|V|)$, which is the sum of the size of the edges and the size of the search indices. For a partitioned graph, the following inequalities hold:

$$|V|\leq\Sigma_{p\in[0,P)}|V_p|\leq P|V|$$

It can be shown that $|V|=\epsilon_{p\in[0,P)}|V_p|$, if and only if $\forall i\neq j\rightarrow V_i\cap V_j=\emptyset$; on the other hand, $\Sigma_{p\in[0,P)}|V_p|=P|V|$, if and only if $V_p=V$. Both cases can happen, although neither is likely. For graphs with no apparent structures, $\Sigma_{p\in[0,P)}|V_p|$ can be closer to $P|V|$ than it is to $|V|$. In any case, $\Sigma_{pE[0,P)}|V_p|$ is bounded from above by $O(P|V|)$.

Based on $\Sigma_{pE[0,P)}|E_p|=|E|$ and $|V|\leq\Sigma_{pE[0,P)}|V_p|\leq P|V|$, one can derive the space complexity for a successor-partitioned graph with P partitions as follows:

$$\sum_{p\in[0,P)} O(|E_p|+|V_p|) = O\left(\sum_{p\in[0,P)}|E_p|+\sum_{p\in[0,P)}|V_p|\right)$$
$$= O\left(\sum_{p\in[0,P)}|E_p|\right) + O\left(\sum_{p\in[0,P)}|V_p|\right)$$
$$= O(|E|) + O(P|V|)$$
$$= O(|E|+P|V|)$$

Thus, $O(|E|+P|V|)$ is the worst-case space complexity of a successor-partitioned graph with P partitions. From the previous analysis $\Sigma_{p\in[0,P)}|V_p|\geq|V|$, and thus the best-case space complexity is $O(|E|+|V|)$, which is the same as the space complexity of the original, unpartitioned graph.

Whether the extra space overhead of successor-partitioned graphs is significant or not depends on the ratio of $|E|$ over $|V|$. Let $b=|E|/|V|$, which is the average branching factor. The worst-case relative size of successor-partitioned graphs compared to their unpartitioned counterparts is:

$$\frac{O(|E|+P|V|)}{O(|E|+|V|)} = \frac{O(b|V|+P|V|)}{O(b|V|+|V|)} = O\left(\frac{b+P}{b+1}\right)$$

The concept of successor-partitioned graphs is useful for conducting parallel graph traversals from vertices to their successors. However, system 100 may need to traverse both forwards and in the reverse direction for a given process or application. To allow synchronization-free parallel graph traversal from vertices to their predecessors, system 100 may generate a predecessor-partitioned graph, which is the dual of a successor-partitioned graph, defined as follows.

Let $v_{min\text{-}src}$ and $v_{max\text{-}src}$ be the minimum and maximum integer identifiers of source vertices, i.e., those with at least one (1) successor. Let $V_{min\text{-}src}$ be an integer array of (P+1) elements, where P is the number of partitions, such that $$V_{min\text{-}src}[0]=v_{min\text{-}src}$$

$$V_{min\text{-}src}[p]<V_{min\text{-}src}[p+1], \text{ for } p=0,1,\ldots,P-1.$$

$$V_{min\text{-}src}[P]=v_{max\text{-}src}+1$$

The edge set E of a predecessor-partitioned graph can be divided into P partitions such that:

$$E'p=\{(u,v)|(u,v)\in E\wedge V_{min\text{-}src}[p]\leq u<V_{min\text{-}src}[p+1]\}, \text{ for } p=0,1,\ldots,P-1.$$

It can be shown that these edge partitions $E'p$ have the following properties:

$$\cup_{p\in[0,P)}E'_p=E$$

$$\forall i\neq j\rightarrow E'_i\cap E'_j=\emptyset,$$

$$\forall (u_i,v_i)\in E'_i\wedge(u_j,v_j)\in E'_j\rightarrow u_i\neq u_j$$

Correspondingly, system 100 may also divide the vertex set V into P partitions such that:

$$V'_p=\{u|\exists(u,v)\in E'_p\vee(v,u)\in E'_p\}, \text{ for } p=0,1,\ldots,P-1.$$

It can be shown that $\cup_{p\in[0,P)}V'_p=V$, if the graph has no isolated vertex. Let $SV_p=\{u|\exists(u,v)\in E'_p\}$ be the set of source vertices in partition p, for $p=0, 1, \ldots, P-1$. It can be shown that these source vertex sets $SV_p$ have the following property:

$$\forall i\neq j\rightarrow SV_i\cap SV_j=\emptyset$$

In other words, the set of source vertices in one partition is guaranteed to be disjoint from the set of source vertices in another partition. When performing parallel graph traversals from vertices to their predecessors, it is guaranteed that different threads (or computers) working on different predecessor-graph partitions can never write to the same source vertices. If a single predecessor-graph partition is only processed by a single thread, then it can be further guaranteed that there will be no concurrent writes to the same source vertex. In the absence of concurrent writes, there is no need for different threads (or computers) to synchronize (or communicate) during the predecessor-partitioned graph traversal stage in order to prevent data corruption on the source vertices. The destination vertices are unaffected as well, since they are read-only in such traversals.

Combining predecessor-partitioned and successor-partitioned graphs, a graph computation system can perform graph traversals in both directions, i.e., from vertices to their predecessors and successors. Furthermore, it is guaranteed that no synchronization needs to take place during any of these traversals.

Recall that both types of partitioned graphs require $V_{min}$, which is an integer array of (P+1) elements such that $$V_{min}[0]=v_{min}$$

$$V_{min}[p]<V_{min}[p+1], \text{ for } p=0,1,\ldots,P-1.$$

$$V_{min}[P]=v_{max}+1$$

where $v_{min}$ and $v_{max}$ are the minimum and maximum integer identifiers of source and destination vertices for predecessor-partitioned and successor-partitioned graphs, respectively. The simplest way to divide up the range between $v_{min}$ and $v_{max}$ inclusively into P sub-ranges is to have P (roughly) equal-sized partitions, where the first P-1 partitions have exactly the same size $\lfloor(v_{max}-v_{min}+1)/P\rfloor$, and the last partition contains the rest of the vertices. That is, $V_{min}[0]=v_{min}$ $V_{Min}[p]=v_{min}+p\lfloor(v_{max}-v_{min}+1)/P\rfloor$, for $p=0,1,\ldots,P-1$.

$V_{min}[P]=v_{max}+1$

Note that $\lfloor(v_{max}-v_{min}+1)/P\rfloor$ is only the vertex size of the first (P−1) partitions, because it only counts the number of vertices in each of these partitions. However, the edge size, which counts the number of edges in a partition, can be quite different from its vertex size. Thus, even for partitions having exactly the same number of vertices, their partition size, which is the sum of their vertex and edge sizes, can still vary from one to another.

There are other ways of dividing up the range between $v_{min}$ and $v_{max}$, including partitions with non-uniform vertex sizes. For example, one possibility is to allow non-uniform vertex sizes in order to make the partition size (roughly) the same across all partitions. Other variations are also possible, provided that the mapping from edges to partitions is deterministic, i.e., a single edge must be mapped to exactly one partition.

As mentioned earlier, one aspect of this disclosure is ensuring that during any graph traversal stage, be it predecessor or successor-based, there is no need for one thread (or computer) to synchronize (or communicate) with another thread (or computer). This disclosure makes the most expensive part of graph search, namely the traversal stages, free of any synchronization or communication. Moreover, when threads (or computers) propagate search information to other threads (or computers) after the traversal stages, they can do so in a streaming fashion, since the updated search information for multiple vertices can be grouped together to reduce communication overhead.

Regarding the shared-memory embodiments and distributed-memory embodiments:

For shared-memory parallel graph search, the number of synchronization can be reduced from O(|E|) to O(1) per graph traversal stage, since all threads can see all the updated search states immediately without synchronization or communication, unlike the distributed-memory case described below.

For distributed-memory parallel graph search, embodiments of this invention can reduce the number of communications from O(|E|) to O(|V|), because all the traversal stages, where edges are enumerated, are made free of communication by this disclosure. Since |E|, the number of edges, is usually (much) greater than |V|, the number of vertices, the savings can be significant.

Note that the communication-complexity analysis above is approximate, because a more accurate analysis would depend on factors such as how the edges are stored and retrieved in a distributed-memory environment and how they are grouped together in inter-computer communications. Similarly, how the search states for vertices are grouped together may affect the communication complexity of various embodiments of this invention. More precisely, $O(|E|/b_e)$ is the communication complexity for the edges, and $O(|V|/b_v)$ is the communication complexity for the vertices, where $b_e$ and $b_v$ are the communication block sizes of edges and vertices used in graph traversal stages, respectively. Typically, $b_e \ll b_v$ and thus the relative communication-complexity advantage of this disclosure can be significantly greater than $O(|E|)/O(|V|)=O(|E|/|V|)=O(b)$, if one considers the difference between $b_e$ and $b_v$. In other words, $O(b \cdot b_v/b_e)$ is a better estimator of the relative complexity advantage of the disclosed embodiments.

Although the precise ratio between $b_v$ and $b_e$ can be hard to determine without empirical study, it is usually safe to assume $b_v > b_e$ in practice, because by can be as large as the communication protocol allows; whereas $b_e$ may be subject to the average branching factor b as well as the locality of the graph. For example, if b is small or the computer responsible for generating the successors (or predecessors) of a vertex doesn't have all of its edges in local memory, then $b_e$ tends to be small. On the other hand, systems applying techniques of this disclosure can group as many vertices in a single message using a linear scan, which is unaffected by b or the locality of the graph.

The complexity analyses above are for a single graph traversal stage, and if there are multiple (traversal or non-traversal) stages, the results should be adjusted accordingly. For example, in the shared-memory case, if the system must perform d traversal steps, then the synchronization complexity would become O(d) instead of O(1) using techniques of this disclosure.

Another advantage of the embodiments disclosed herein is the ability to accommodate special-case approaches (in category #2) without forcing them to be limited by the number of graph partitions. This is an important advantage, because it lets one use more threads (or computers) than there are graph partitions to perform these special-case approaches. Consider the case where there are P graph partitions but m×P cores are available to perform breadth-first search. It turns out that each partition can still use m cores concurrently, and thus a total of m×P cores can be used in these P partitions without any synchronization. Variations of this idea, including those that use a non-uniform number of cores to process each partition, are possible. For example, the number of cores assigned to process a single partition can be proportional to the number of edges in the partition. It is appealing that these variations are fully compatible with the special-case approaches in category #2 without limiting the number of cores used to process a single partition.

A further advantage is the ability to improve the space and time efficiency of certain special-case approaches such as n-bit breadth-first search where n<8. Given the famous six-degree-of-separation rule of social networks, it can be shown that one only needs a few bits to encode the degrees of separation for small world graphs. For example, 3 bits would be sufficient to encode up to 7 degrees of separation. Unfortunately, a parallel breadth-first search approach must use at least a byte (8 bits) for the degree of separation, regardless of the maximum degrees of separation. The reason is that when multiple threads write the same value to a memory cell, a byte is the smallest memory unit that can guarantee consistency. With the embodiments of this disclosure, such a minimum-one-byte encoding constraint can be removed, as long as each partition is searched by one thread.

This also makes it possible to apply advanced variants of breadth-first search such as parallel 2-bit breadth first search in its native form to achieve significant memory and runtime savings. Note that advanced 2-bit breadth-first search can compute the degree of separation for arbitrary graphs, as opposed to only for those that have less than 4 degrees of separation. Detailed description of 2-bit breadth-first search are available in the literature, and the best existing parallel 2-bit breadth-first search requires 8 bits rather than 2 bits to store a vertex. This disclosure is the first to enable a true 2-bit parallel breadth-first search, where only 2 bits are used to encode a degree of separation and/or a vertex. More broadly, this disclosure enables n-bit parallel breadth-first search, where n bits are used to encode a degree of separation and/or a vertex and n<8.

Experimental Results

Experiments were conducted to evaluate the effectiveness of the disclosed techniques. The graph used is based on customer purchase data of the following form: <customer_id><product_id>, where a product with <product_id> is purchased by a customer with <customer_id>. The customer-product graph is a bipartite graph where an edge can only exist between a customer vertex and a product vertex. The edge indicates that the customer has purchased the product. The benchmark query has the following stages:

1. Starting from a customer vertex, find the set of products purchased by the customer
2. Find other customers who have purchased at least one of these products
3. Find the most popular product purchased by these customers The query above is a collaborative filter, which can be used to make recommendations for the customer identified in Step 1. It is chosen to benchmark the parallel efficiency of embodiments of this disclosure for the following reasons.

First, it requires both successor-partitioned and predecessor-partitioned graphs. Step 1 requires a successor-partitioned graph, because the traversal direction is from a customer to products (i.e., from a vertex to its successors). Step 2 requires a predecessor-partitioned graph for the opposite traversal direction (i.e., from a vertex to its predecessors). Second, the query contains a non-graph based step, namely Step 3 which requires sorting. Since many real-world applications contain both graph and non-graph based computation, having a sorting step in the benchmark query can increase the application realism of the experiments.

The customer-product graph used in the experiments has about 24.4 million edges in one traversal direction. Thus, the total number of edges stored is about 24.4×2=48.8 million edges for traversals in both directions. There are about 3 million unique customers and over 400K unique products. A set of 100 random customers were chosen as different "seeds" of the query used in Step 1, and the average wall-clock seconds were recorded. As the baseline, a cache-friendly implementation of graph traversal is used that divides up the set of vertices into many disjoint ranges and then backs up the values of these vertices from their successors in parallel. The baseline implementation avoids the contention among threads by assigning each thread a "write" region that is disjoint from the rest of the threads. All threads in the baseline implementation must scan the full range of destination vertices for values that need to be backed up to the source vertices. The test machine used has an Intel Xeon E3-1225 3.1 GHz processor with 4 cores and 8 GB of RAM. The best configuration is used for the baseline and the new parallel techniques enabled by this disclosure.

The average wall-clock time is 172 milliseconds for the baseline, and 24 milliseconds for the new technique, which is about 7.2× faster than the baseline. Note that a number of steps, including memory initialization and product filtering, in the benchmark query are common to both the baseline and the new technique, although they have nothing to do with graph search. Thus, the relative speed advantage of the new technique in terms of graph traversal can be greater than what is observed here.

Furthermore, the baseline implementation doesn't perform sorting in Step 3, since it only needs to find the product with the highest number of purchases; whereas the new technique uses an ordinary sequential sort algorithm (qsort) to rank order all products that have been purchased by at least one of the customers identified in Step 2. The 24 milliseconds of the new technique accounts for all the computation including the sorting step (required to find the top k most popular products). What is not included in these 24 milliseconds is the one-time computational investment to create the predecessor-partitioned and successor-partitioned graphs, which takes about 430 milliseconds for all 3 million customers. Thus, the amortized cost of partitioning the graph is quite negligible.

Exemplary System

Figure 7:
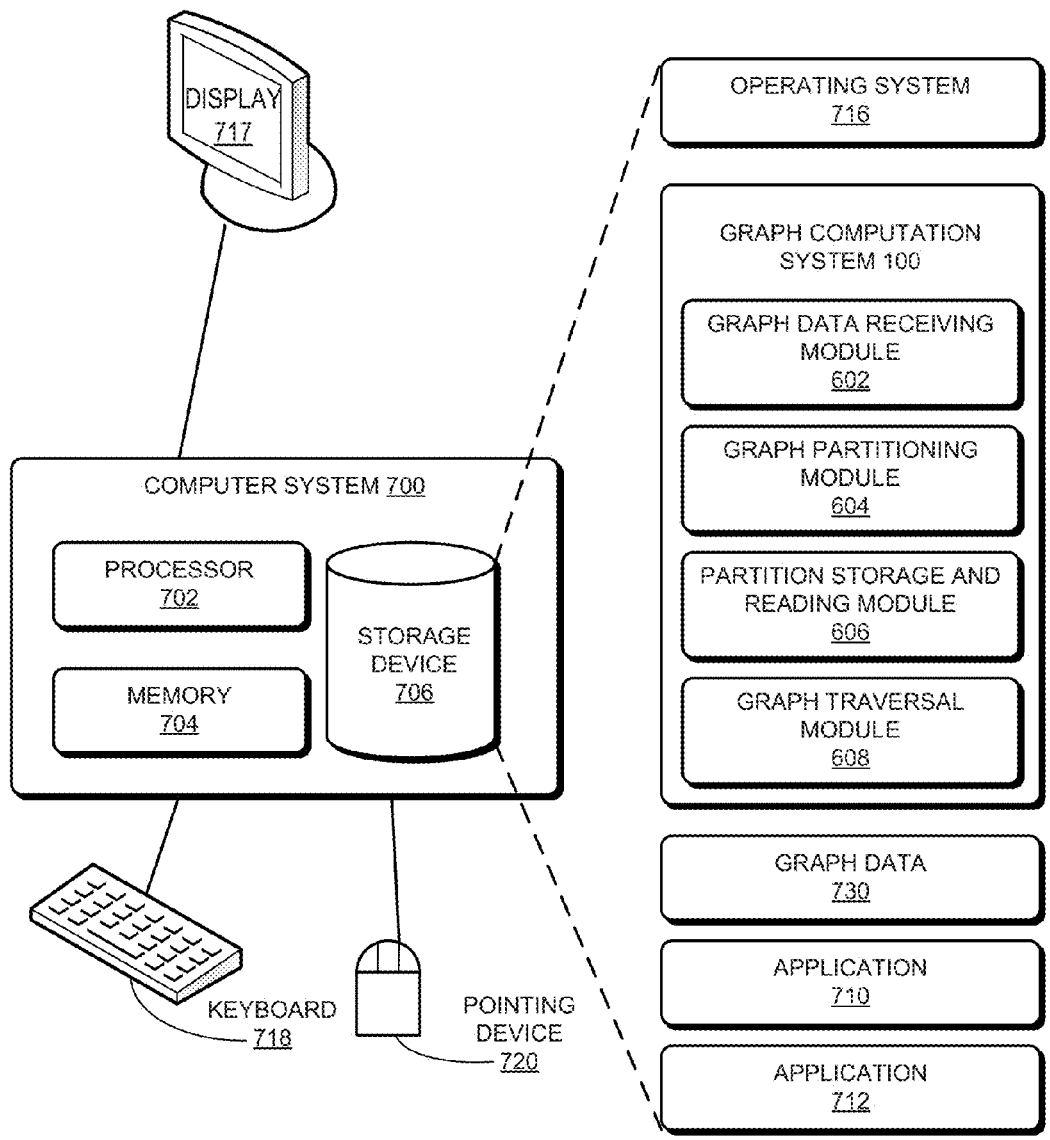
FIG. 7 illustrates an exemplary computer system that facilitates partitioning graphs for parallel computations, in accordance with one embodiment of the present invention.

FIG. 7 illustrates an exemplary computer system 700 that facilitates partitioning graphs for parallel computations, in accordance with one embodiment of the present invention. In one embodiment, computer system 700 includes a processor 702, a memory 704, and a storage device 706. Storage device 706 stores a number of applications, such as applications 710 and 712 and operating system 716. Storage device 706 also stores graph computation system 100, which may include a graph data receiving module 602, graph partitioning module 604, partition storage and reading module 606, and graph traversal module 608. During operation, one or more applications, such as graph computation system 100, are loaded from storage device 706 into memory 704 and then executed by processor 702. While executing the program, processor 702 performs the aforementioned functions. Computer and communication system 700 may be coupled to an optional display 717, keyboard 718, and pointing device 720.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for recommending a product to a consumer, comprising:
copying, by one or more processors to a memory of one or more computing devices, data representing source vertices, destination vertices, and edges of a graph, wherein a respective edge pointing from a source vertex representing a respective consumer to a destination vertex representing a respective product indicates that the respective consumer consumes the respective product;

partitioning the graph edges based on destination vertices to generate a plurality of successor-partitioned graphs;

partitioning the graph edges based on source vertices to generate a plurality of predecessor-partitioned graphs;

determining, by a plurality of processors operating in parallel, one or more products that the consumer consumes, which includes traversing, by a respective processor, a successor-partitioned graph from a source vertex representing the consumer to one or more destination vertices, wherein a respective destination vertex represents a product the consumer consumes;

determining, by the plurality of processors operating in parallel, one or more other consumers that consumes at least one product that the consumer also consumes, which includes traversing, by a respective processor, a predecessor-partitioned graph from a respective destination vertex to a respective source vertex, wherein a respective source vertex represents another consumer that consumes a product that the consumer also consumes;

determining one or more other products that the one or more other consumers consume; and providing a recommendation to the consumer to consume one of the one or more other products.

2. The method of claim 1, wherein the parallel computations comprise executing an n-bit parallel breadth-first search where n bits represent a degree of separation or a vertex and $n<8$.

3. The method of claim 1, further comprising:
assigning a first successor-partitioned graph with vertices in a first range to a first processor; and
assigning a second successor-partitioned graph with vertices in a second range to a second processor, wherein the first range and second range are different ranges.

4. The method of claim 1, wherein no two processors of the plurality of processors operating in parallel operate on the same vertex.

5. The method of claim 1, wherein partitioning the graph edges based on destination vertices further comprises:
determining a number of partitions for dividing the destination vertices; and
dividing a range of the destination vertices among the number of partitions.

6. A non-transitory computer-readable storage medium storing instructions that when executed by a computer cause the computer to perform a method for recommending a product to a consumer, comprising:
copying, by one or more processors to a memory of one or more computing devices, data representing source vertices, destination vertices, and edges of a graph, wherein a respective edge pointing from a source vertex representing a respective consumer to a destination vertex representing a respective product indicates that the respective consumer consumes the respective product;

partitioning the graph edges based on destination vertices to generate a plurality of successor-partitioned graphs;

partitioning the graph edges based on source vertices to generate a plurality of predecessor-partitioned graphs;

determining, by a plurality of processors operating in parallel, one or more products that the consumer consumes, which includes traversing, by a respective processor, a successor-partitioned graph from a source vertex representing the consumer to one or more destination vertices, wherein a respective destination vertex represents a product the consumer consumes;

determining, by the plurality of processors operating in parallel, one or more other consumers that consumes at least one product that the consumer also consumes, which includes traversing, by a respective processor, a predecessor-partitioned graph from a respective destination vertex to a respective source vertex, wherein a respective source vertex represents another consumer that consumes a product that the consumer also consumes;

determining one or more other products that the one or more other consumers consume; and providing a recommendation to the consumer to consume one of the one or more other products.

7. The non-transitory computer-readable storage medium of claim 6, wherein the parallel computations comprise executing an n-bit parallel breadth-first search where n bits represent a degree of separation or a vertex and $n<8$.

8. The non-transitory computer-readable storage medium of claim 6, wherein the method further comprises:
assigning a first successor-partitioned graph with vertices in a first range to a first processor; and
assigning a second successor-partitioned graph with vertices in a second range to a second processor, wherein the first range and second range are different ranges.

9. The non-transitory computer-readable storage medium of claim 6, wherein no two processors of the plurality of processors operating in parallel operate on the same vertex.

10. The non-transitory computer-readable storage medium of claim 6, wherein partitioning the graph edges based on destination vertices further comprises:
determining a number of partitions for dividing the destination vertices; and
dividing a range of the destination vertices among the number of partitions.

11. A computing system for recommending a product to a consumer, the system comprising:
one or more processors,
a non-transitory computer-readable medium coupled to the one or more processors having instructions stored thereon that, when executed by the one or more processors, cause the one or more processors to perform a method comprising:
copying, by one or more processors to a memory of one or more computing devices, data representing source vertices, destination vertices, and edges of a graph, wherein a respective edge pointing from a source vertex representing a respective consumer to a destination vertex representing a respective product indicates that the respective consumer consumes the respective product;

partitioning the graph edges based on destination vertices to generate a plurality of successor-partitioned graphs;

partitioning the graph edges based on source vertices to generate a plurality of predecessor-partitioned graphs;

determining, by a plurality of processors operating in parallel, one or more products that the consumer consumes, which includes traversing, by a respective processor, a successor-partitioned graph from a source vertex representing the consumer to one or more destination vertices, wherein a respective destination vertex represents a product the consumer consumes;

determining, by the plurality of processors operating in parallel, one or more other consumers that consumes at least one product that the consumer also consumes, which includes traversing, by a respective processor, a predecessor-partitioned graph from a respective destination vertex to a respective source vertex, wherein a respective source vertex represents another consumer that consumes a product that the consumer also consumes;

determining one or more other products that the one or more other consumers consume; and providing a recommendation to the consumer to consume one of the one or more other products.

12. The computing system of claim 11, wherein the parallel computations comprise executing an n-bit parallel breadth-first search where n bits represent a degree of separation or a vertex and n<8.

13. The computing system of claim 11, wherein the method further comprises:

assigning a first successor-partitioned graph with vertices in a first range to a first processor, and assigning a second successor-partitioned graph with vertices in a second range to a second processor, wherein the first range and second range are different ranges.

14. The computing system of claim 11, wherein no two processors of the plurality of processors operating in parallel operate on the same vertex.

15. The computing system of claim 11, wherein partitioning the graph edges based on destination vertices further comprises:

determining a number of partitions for dividing the destination vertices; and dividing a range of the destination vertices among the number of partitions.

* * * * *